UNITED STATES PATENT OFFICE.

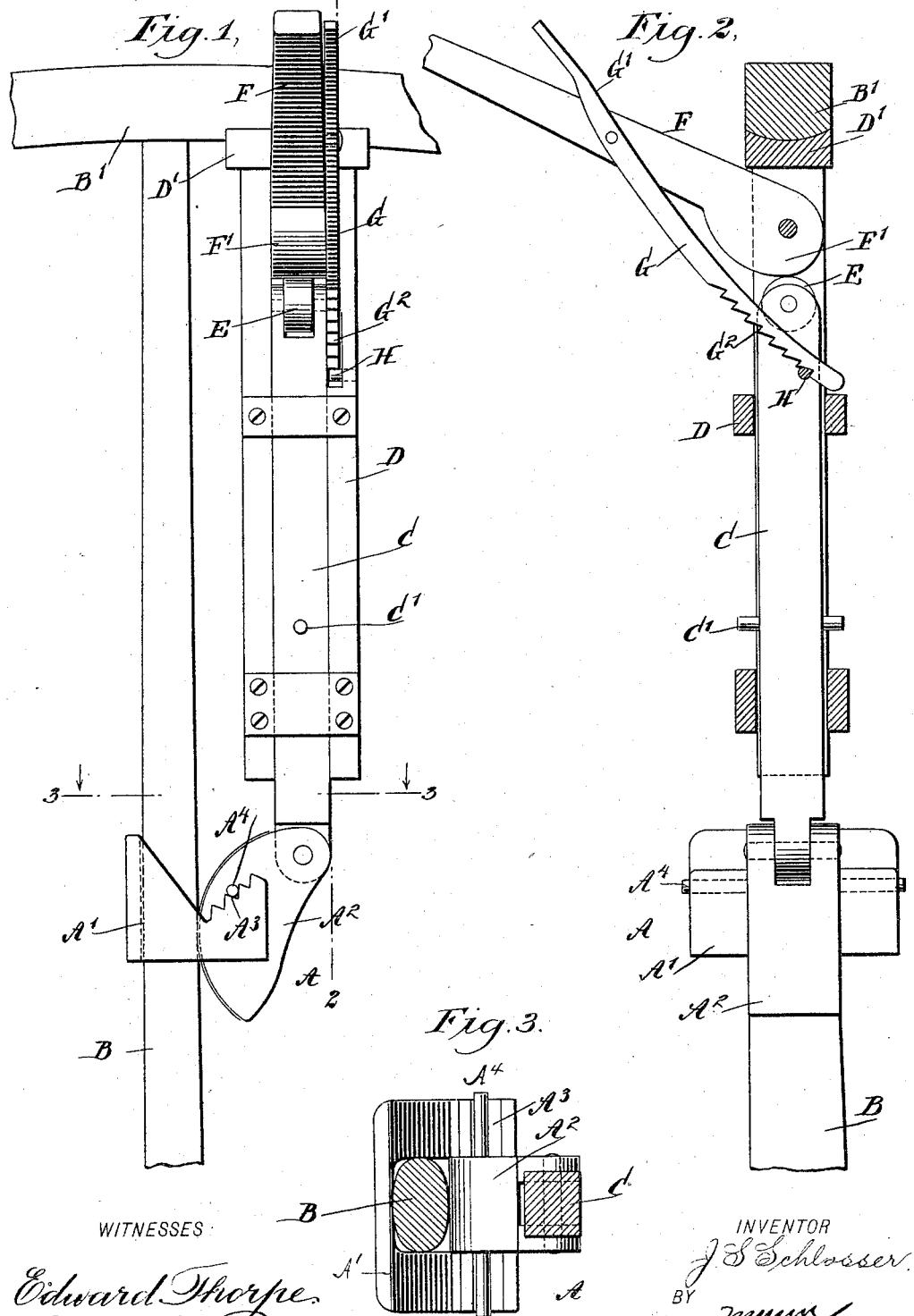

JOHN S. SCHLOSSER, OF WADSWORTH, ILLINOIS.

JACK.

SPECIFICATION forming part of Letters Patent No. 610,246, dated September 6, 1898.

Application filed November 11, 1897. Serial No. 658,191. (No model.)

*To all whom it may concern:*

Be it known that I, JOHN S. SCHLOSSER, of Wadsworth, in the county of Lake and State of Illinois, have invented a new and Improved Jack, of which the following is a full, clear, and exact description.

The object of the invention is to provide a new and improved jack which is simple and durable in construction, easily applied, and conveniently manipulated, the jack being more especially designed for raising the felly from the spoke of a wheel to permit the insertion of a washer on the tenon of the spoke to insure a firm joint and to prevent the wheel from rattling.

The invention consists in the novel features and parts and combinations of the same, as will be hereinafter more fully described, and pointed out in the claims.

Reference is to be had to the accompanying drawings, forming a part of this specification, in which similar characters of reference indicate corresponding parts in all the figures.

Figure 1 is a side elevation of the improvement as applied. Fig. 2 is a transverse section of the same on the line 2 2 of Fig. 1, and Fig. 3 is a sectional plan view of the same on the line 3 3 of Fig. 1.

The improved jack is provided with a support A, adapted to engage the spoke B of a wheel and arranged to carry a lifting device for engaging the inside of a felly B', so as to move the latter outwardly from the spoke B to allow the insertion of a washer on the tenon of the spoke. The support A consists of a U-shaped member A', preferably lined with rubber or like material, to fit upon the spoke B, and a cam member $A^2$, provided with a pivot-pin $A^4$, engaging one of sets of steps $A^3$, formed on the other member A'. The cam-surface of the member $A^2$ is adapted to engage the side of the spoke not engaged by the member A', and the outer upper end of the said member $A^2$ is pivotally connected with a post C, fitted to slide in suitable bearings in a frame D, formed at its upper end with a head D' for engaging the inside of the felly B' to lift the latter off the spoke, as hereinafter more fully described. The upper end of the post C carries a friction-roller E, engaged on its periphery by the cam-surface F' of a cam-lever F, fulcrumed on the upper end of the frame D, the said cam-lever serving to press against the friction-roller E, so as to cause the frame D to slide on the post C as the latter is held stationary on the support A.

Now it is evident that when the device is applied on the wheel, as shown in Fig. 1, the head D' engages the inside of the felly B' and the support A is clamped on the spoke B. When the operator presses down on the lever F, the cam-surface F' in pressing on the friction-roller E causes the post C to exert a pressure on the cam member $A^2$, so that the latter swings with its cam-surface firmly in contact with the spoke B to clamp the support A securely in place on the spoke. A further pressure on the lever F causes the frame D to slide outward or upward on the post C, so that the head D' exerts a pressure against the felly B' and lifts the same off the spoke B to permit the insertion of a washer on the tenon of the spoke next to the inside of the felly.

When the felly B' has been lifted a sufficient distance for the release of the spoke B, then the parts are locked in place by means of a locking-arm G, fulcrumed on the cam-lever F and provided with a finger-piece G' at one end and teeth $G^2$ at the other end, the teeth being adapted to engage a pin H, carried on the frame D. Thus when the lever F is in a lowermost position one of the teeth $G^2$ engages the pin H and locks the lever F in position, so as to enable the operator to conveniently insert the washer on the tenon, as previously explained. When the washer has been inserted, the operator slightly presses down on the lever F and then presses on the finger-piece G' to swing the teeth $G^2$ clear of the pin H to allow a return movement of the lever F and a downward sliding of the frame D to disengage the head D' from the felly B'. The upper end of the cam member $A^2$ of the support A is now swung inward to move the cam-surface out of contact with the spoke B and to allow of lifting the cam member $A^2$, with its pivot-pin $A^4$, out of the set of steps $A^3$ to disconnect the said member $A^2$ from the member A' and to allow of removing the latter from the spoke B.

To prevent the post C from accidentally sliding out of the frame D, I provide the said post with a stop-pin C', adapted to engage one of the bearings for the post on the said frame. By having the several steps for the pivot-pin $A^4$, I am enabled to apply the support A to spokes of different thicknesses and at the same time allow the clamping member $A^2$ to swing on the other member $A'$ for attaching the support to the spoke.

Now it will be seen from the foregoing that the jack is simple in construction, not liable to get out of order, and can be readily applied to any-sized wheel for the purpose mentioned.

Having thus fully described my invention, I claim as new and desire to secure by Letters Patent—

1. A jack provided with a support adapted to be clamped to the spoke of a wheel, the said support comprising a U-shaped member formed with sets of steps, and a clamping member having a cam-surface and a pivot-pin for engaging the steps, substantially as shown and described.

2. A jack provided with a support adapted to be clamped to the spoke of a wheel, a lifting device comprising a post pivotally connected with the support, a frame in which the post is fitted to slide, a cam-lever for sliding the frame on the post and in engagement with the felly of the wheel, and a locking-arm for locking the cam-lever in place, as set forth.

3. A jack comprising a support formed of two detachable members, one of which is mounted to swing on the other, and a lifting device provided with a post pivotally connected with the pivoted member of the said support, a frame in which the post is fitted to slide, a head on the said frame for engagement with the felly, and a cam-lever fulcrumed in the frame and engaging the said post, substantially as shown and described.

4. The combination of a U-shaped member, provided with steps on each arm thereof, a cam having pivot-pins bearing on the steps, whereby to rockably mount the cam, a post pivoted to the cam, a frame slidable on the post, and means for moving the frame along the post.

5. The combination of a U-shaped member, having steps on each arm thereof, a cam having a pivot-pin projecting beyond each side thereof, the ends of the pins being seated on the steps, a post pivoted to the cam, a frame sliding on the post, and a cam-lever mounted on the frame and capable of engaging the post to move the frame.

6. The combination of a U-shaped member, each arm of which is provided with steps, and a cam having pivots bearing on said steps, whereby to rockably mount the cam on the U-shaped member.

JOHN S. SCHLOSSER.

Witnesses:
JACOB THEOBALD,
J. B. SCHLOSSER.